United States Patent
Ricketts

(10) Patent No.: US 11,832,557 B2
(45) Date of Patent: Dec. 5, 2023

(54) ROTATIONAL ROTOR DISCHARGE DEFLECTOR

(71) Applicant: CNH Industrial America LLC, New Holland, PA (US)

(72) Inventor: Jonathan E. Ricketts, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 568 days.

(21) Appl. No.: 17/046,503

(22) PCT Filed: Apr. 9, 2019

(86) PCT No.: PCT/US2019/026677
§ 371 (c)(1),
(2) Date: Oct. 9, 2020

(87) PCT Pub. No.: WO2019/199898
PCT Pub. Date: Oct. 17, 2019

(65) Prior Publication Data
US 2021/0105945 A1    Apr. 15, 2021

Related U.S. Application Data

(60) Provisional application No. 62/656,063, filed on Apr. 11, 2018.

(51) Int. Cl.
*A01F 7/06* (2006.01)
*A01D 41/12* (2006.01)

(52) U.S. Cl.
CPC .......... *A01F 7/067* (2013.01); *A01D 41/1243* (2013.01)

(58) Field of Classification Search
CPC ....... A01F 7/067; A01F 41/1243; A01F 12/40
See application file for complete search history.

(56) References Cited

U.S. PATENT DOCUMENTS 2,626,159 A * 1/1953 Thompson .............. A01F 12/40
460/109
4,018,232 A   4/1977 Rowland-Hill et al.
(Continued)

FOREIGN PATENT DOCUMENTS

BE      879640 A  * 2/1980  .............. A01F 7/06
DE  10249257 A1  * 5/2004  .............. A01F 12/40
(Continued)

OTHER PUBLICATIONS

International Search Report and Written Order for Application No. PCT/US2019/026677 dated Jan. 3, 2020 (17 Pages).

*Primary Examiner* — Arpad F Kovacs

(57) ABSTRACT

An agricultural vehicle including a rotor configured for threshing a crop material and a housing located at a distance radially away from the rotor and circumferentially encasing at least a portion of the rotor. The agricultural vehicle also includes a discharge chopper positioned downstream of the rotor in a direction of crop material flow, and a discharge deflector moveably connected to the housing, circumferentially disposed around at least a portion of the rotor, and located at a radial distance away from the rotor. The discharge deflector has a distal end that defines a discharge opening for allowing the crop material to pass from the rotor to the discharge chopper such that as the discharge deflector is moved a circumferential position of the discharge opening is correspondingly moved without changing the radial distance between the discharge deflector and the rotor.

20 Claims, 2 Drawing Sheets

(56) References Cited

U.S. PATENT DOCUMENTS

| | | | | |
|---|---|---|---|---|
| 4,284,086 A * | 8/1981 | Williams | A01F 12/18 | 460/80 |
| 4,489,734 A * | 12/1984 | Van Overschelde | A01F 12/40 | 56/192 |
| 4,510,948 A * | 4/1985 | Dekeyzer | A01F 12/442 | 460/112 |
| 4,718,434 A * | 1/1988 | Raineri | A01F 7/065 | 460/109 |
| 5,503,339 A * | 4/1996 | Doppstadt | B02C 13/04 | 241/189.1 |
| 6,152,820 A * | 11/2000 | Heidjann | A01F 12/40 | 460/80 |
| 6,352,474 B1 * | 3/2002 | Payne | A01F 7/06 | 460/80 |
| 7,186,179 B1 | 3/2007 | Anderson et al. | | |
| 7,485,035 B1 | 2/2009 | Yde | | |
| 8,333,640 B2 | 12/2012 | Bussmann | | |
| 10,010,028 B1 * | 7/2018 | Dilts | A01F 12/40 | |
| 10,531,611 B2 * | 1/2020 | Larson | A01D 41/127 | |
| 2005/0282602 A1 * | 12/2005 | Redekop | A01F 12/40 | 460/112 |
| 2006/0073860 A1 * | 4/2006 | Redekop | A01D 41/1243 | 460/112 |
| 2007/0037620 A1 * | 2/2007 | Anderson | A01F 7/067 | 460/111 |
| 2008/0058042 A1 * | 3/2008 | Isaac | A01F 7/067 | 460/119 |
| 2010/0291982 A1 * | 11/2010 | Isaac | A01F 12/40 | 460/111 |
| 2015/0038201 A1 * | 2/2015 | Brinkmann | A01F 29/00 | 460/112 |
| 2017/0086379 A1 * | 3/2017 | Weichholdt | A01F 12/39 | |
| 2017/0099771 A1 * | 4/2017 | Linde | A01D 41/1243 | |
| 2018/0235151 A1 * | 8/2018 | Isaac | A01F 7/067 | |
| 2020/0337237 A1 * | 10/2020 | Smith | A01D 41/127 | |
| 2021/0337730 A1 * | 11/2021 | Rittershofer | A01D 41/1243 | |

FOREIGN PATENT DOCUMENTS

| | | | | |
|---|---|---|---|---|
| EP | 2364587 B1 | 12/2013 | | |
| EP | 2965615 A1 * | 1/2016 | | A01D 41/1243 |
| EP | 3714675 A1 * | 9/2020 | | A01D 41/1243 |
| EP | 3714678 A1 * | 9/2020 | | A01F 7/067 |
| WO | WO-2014179563 A1 * | 11/2014 | | A01F 12/40 |

* cited by examiner

ROTATIONAL ROTOR DISCHARGE DEFLECTOR

FIELD OF THE INVENTION

The present invention relates to agricultural vehicles, and, more particularly, to agricultural vehicles with discharge deflectors.

BACKGROUND OF THE INVENTION

An agricultural harvester known as a "combine" is historically termed such because it combines multiple harvesting functions with a single harvesting unit, such as picking, threshing, separating, and cleaning. A combine includes a header, which removes the crop from a field, and a feeder housing which transports the crop matter to a threshing and cleaning system. The threshing and cleaning system may include a threshing rotor that rotates within a housing and performs a threshing operation on the crop material to remove the grain. The housing may include adjustable concaves with perforations for the grain to pass therethrough. Once the grain is threshed, it falls through the perforations in the concaves onto a grain pan. From the grain pan, the grain is cleaned using the cleaning system, which generally includes one or more sieve(s) and a cleaning fan. The cleaning fan blows air through the sieves to discharge chaff and other debris toward the rear of the combine. The clean grain is then transported to a grain tank onboard the combine via a clean grain auger. Material other than grain (MOG), such as straw, debris, dust, etc., from the threshing section proceeds through a residue system, which may utilize a straw chopper to process the MOG and direct it out through the rear of the combine.

The residue system of a combine generally includes a discharge chopper in the form of a rotor or beater, a chopper floor pan positioned underneath the discharge chopper, beater plates, a discharge deflector, and a residue spreader. The discharge deflector can be pivotally connected to one of the beater plates and positioned in between the inner wall of the discharge deflector and the rotor, at a position above the discharge chopper. The discharge deflector is generally in the form of a pivotable metal panel that contacts the crop residue exiting the rotor and directs the crop residue toward the discharge chopper. To move crop residue to a different location along the longitudinal axis of the discharge chopper, the discharge deflector is pivoted inwardly or outwardly away from the rotor. When moving the discharge deflector inwardly toward the rotor, the clearance passageway for the crop material to flow therebetween becomes smaller; and thereby, the horsepower of the rotor, which is required to move the crop residue therethrough, must be increased. In other words, the discharge deflector can lead to energy inefficiencies in the threshing system. Further, since the discharge deflector remains fixed at a pivot location, the location of the discharge opening is not materially altered. Meaning, the deflector can often have a minor beneficial effect because it does not materially redirect the flow of the crop residue.

What is needed in the art is an improved residue system for changing the distribution of crop material exiting the threshing system.

SUMMARY OF THE INVENTION

In one exemplary embodiment formed in accordance with the present invention, there is provided a residue system with a rotating discharge deflector. The discharge deflector is arced correspondingly to the shape of the rotor, and the discharge deflector may be movable such that the distal end of the discharge deflector can be moved upwardly or downwardly in order to the change the position of the discharge opening. Thereby, the position of the discharge deflector can be altered without forcing the crop residue discharging from the rotor to pass through a reduced clearance passageway.

In another exemplary embodiment formed in accordance with the present invention, there is provided an agricultural vehicle including a rotor configured for threshing a crop material and a housing located at a distance radially away from the rotor and circumferentially encasing at least a portion of the rotor. The agricultural vehicle also includes a discharge chopper positioned downstream of the rotor in a direction of crop material flow, and a discharge deflector moveably connected to the housing, circumferentially disposed around at least a portion of the rotor, and located at a radial distance away from the rotor. The discharge deflector has a distal end that defines a discharge opening for allowing the crop material to pass from the rotor to the discharge chopper such that as the discharge deflector is moved a circumferential position of the discharge opening is correspondingly moved without changing the radial distance between the discharge deflector and the rotor.

In another exemplary embodiment formed in accordance with the present invention, there is provided a residue system for an agricultural vehicle having a rotor and a housing surrounding the rotor. The residue system includes a discharge chopper configured for processing a crop material downstream of the rotor in a direction of crop material flow, and a discharge deflector configured for being moveably connected to the housing, circumferentially disposed around at least a portion of the rotor, and located at a radial distance away from the rotor. The discharge deflector has a distal end that defines a discharge opening for allowing the crop material to pass from the rotor to the discharge chopper such that as the discharge deflector is moved a circumferential position of the discharge opening is correspondingly moved without changing the radial distance between the discharge deflector and the rotor.

In yet another exemplary embodiment formed in accordance with the present invention, there is provided a method of operating an agricultural vehicle having a rotor and a housing surrounding the rotor. The method includes a step of providing a residue system including a discharge chopper configured for processing a crop material downstream of the rotor in a direction of crop material flow, and a discharge deflector configured for being moveably connected to the housing, circumferentially disposed around at least a portion of the rotor, and located at a radial distance away from the rotor. The discharge deflector has a distal end that defines a discharge opening for allowing the crop material to pass from the rotor to the discharge chopper. The method also includes the steps of directing a crop material flow by the discharge deflector toward the discharge chopper, changing a circumferential position of the discharge opening by moving the discharge deflector, and maintaining the radial distance between the discharge deflector and the rotor as the circumferential position of the discharge opening is changed.

One possible advantage of the exemplary embodiment of the residue system is that the rotating discharge deflector can achieve a desired discharge distribution of crop residue without increasing the requisite horsepower of the rotor or stagnating the crop material flow.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
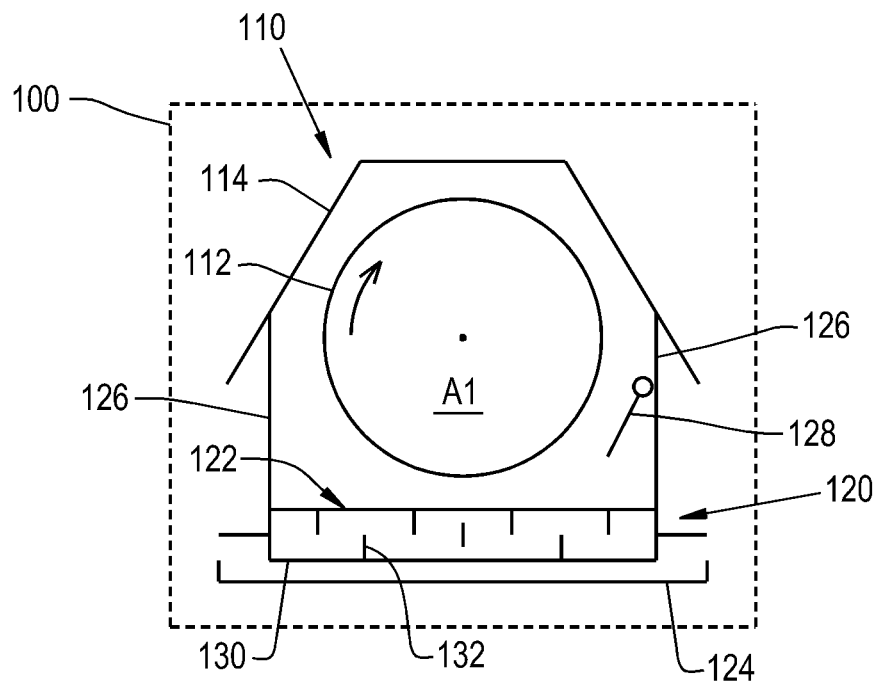
FIG. 1 illustrates a schematic view of a known agricultural vehicle.

Referring now to the drawings, and more particularly to FIG. 1, there is shown a known agricultural vehicle 100 in the form of a combine 100, which generally includes a threshing system 110 for threshing and separating the crop material and a residue system 120 for processing and dispensing the crop material, such as MOG, out of the rear of the combine 100.

The threshing system 110 is of the axial-flow type, and generally includes a rotor 112, which is rotatable about a longitudinal axis A1 thereof and is at least partially enclosed by and rotatable within a corresponding, cylindrical housing 114. The housing 114 is located at a distance radially away from the rotor and circumferentially encases at least a portion of the rotor 112 and generally includes an upper hemisphere in the form of a rotor shield and a lower hemisphere in the form of one or more concave(s) located at a distance radially away from the rotor 112. The housing 114 may also include an upper race track. A gap, e.g. a clearance passage, exists between the rotor 112 and the housing 114, which allows crop material to be threshed therethrough. Larger elements, such as stalks, leaves and the like may be discharged out of the rear of the rotor 112 toward the residue system 120 for eventually discharging out of the rear of the combine 100. Smaller elements of crop material, including grain and non-grain crop material, and including particles lighter than grain, such as chaff, dust and straw, may be discharged through the perforations of the concave(s).

The residue system 120 generally includes a discharge chopper 122, a chopper floor pan 124, beater plates 126, a discharge deflector 128, and a spreader for discharging the MOG onto the field (not shown). The discharge chopper 122 is positioned downstream of the rotor 112 in a direction of crop material flow. The discharge chopper 122 rotates about an axis of rotation and typically includes a discharge rotor 130 and multiple knives 132. The discharge chopper 122 may be operably driven by the prime mover of the agricultural vehicle 100. The beater plates 126 may be connected to the housing 114, which encases the rotor 112. The discharge deflector 128 directs the crop residue onto the discharge chopper 122 at a desired location. The discharge deflector 128 may be pivotally connected to one of the beater plates 126. As shown, the discharge deflector 128 is connected to the right beater plate 126. The discharge deflector 128 may be in the form of a metal panel which pivots to alter the flow bath of the crop residue exiting to the rotor 112. In other words, as the discharge deflector 128 pivots, the distal end of the discharge deflector 128 moves radially inward or outward relative to the rotor 112. When the discharge deflector 128 is moved inwardly toward the rotor 112, the discharge opening, e.g. clearance passageway, for the crop residue to flow therebetween becomes smaller. The reduction in size of the discharge opening can lead to a congested material flow, energy inefficiencies, and a reduced operating life of the threshing system 110.

Figure 2:
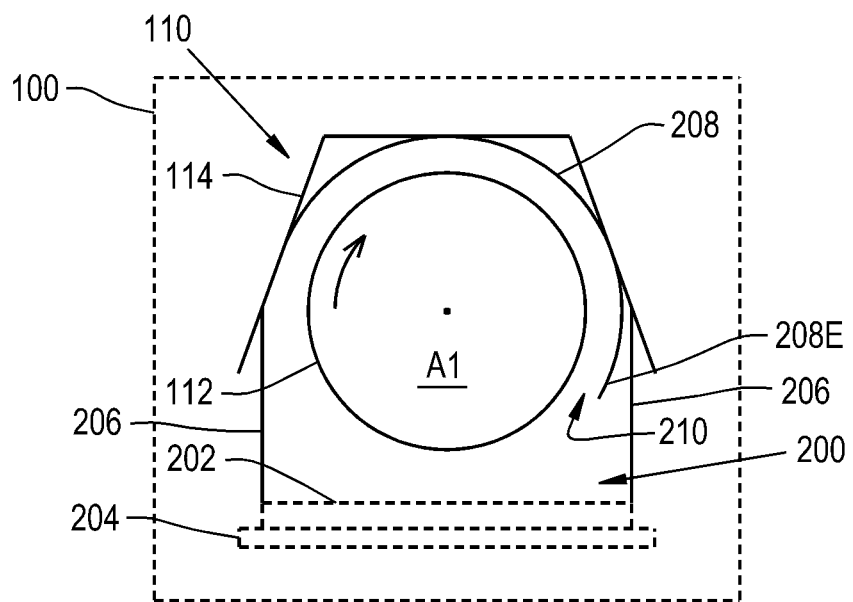
FIG. 2 illustrates a schematic view of an exemplary embodiment of an agricultural vehicle including a rotor and a rotational deflector, in accordance with an exemplary embodiment of the present invention.
Figure 3:
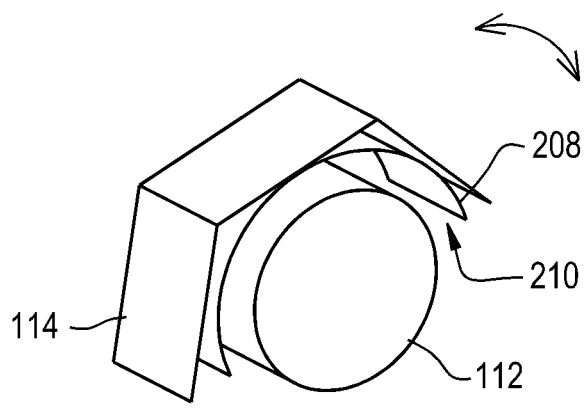
FIG. 3 illustrates a perspective view of the rotor and the rotational deflector of FIG. 2, in accordance with an exemplary embodiment of the present invention.

Referring now collectively to FIGS. 2-3, there is shown an exemplary embodiment of a residue system 200 in accordance with the present invention. The residue system 200 may be incorporated within the agricultural vehicle 100 as described above, and thereby like parts have been identified with like reference characters. However, the residue system 200 may be incorporated into any desired agricultural vehicle or implement. The residue system 200 is configured for processing the residue exiting the threshing system 110, e.g. MOG exiting from the rotor 112. The residue system 200 may generally include a discharge chopper 202, a chopper floor pan 204, beater plates 206, a discharge deflector 208, and a spreader for discharging the MOG onto the field (not shown).

The discharge chopper 202 and the chopper floor pan 204 may be in the form of a discharge chopper 122 and a chopper floor pan 124, respectively, as described above. The beater plates 206 may extend on each side of the rotor 112 from the housing 114 to the discharge chopper 122. As shown in the present exemplary embodiment, the beater plates 206 do not mount the discharge deflector 208.

The discharge deflector 208 may be circumferentially disposed around at least a portion of the rotor 112 and located at a radial distance away from the rotor 112. The discharge deflector 208 may extend around a majority of an upper perimeter of the rotor 112. The discharge deflector 208 has a distal end 208E that defines a discharge opening 210, e.g. a clearance passageway, for allowing the crop material, such as MOG, to pass from the rotor 112 to the discharge chopper 202 (FIG. 2). In other words, the discharge deflector 208 contacts and directs the crop residue onto a desired location of the discharge chopper 202. When the discharge deflector 208 is moved, a circumferential position of the discharge opening 210 is correspondingly moved without changing the radial distance between the discharge deflector 208 and the rotor 112. In this regard, the discharge deflector 208 can be rotated clockwise or counterclockwise in order to change the physical location of the discharge opening 210 along the perimeter of the travel path of the discharge deflector 208. Thereby, throughout the travel path of the discharge deflector 208, the crop residue is never forced to pass through a reduced in size opening. The discharge deflector 208 can be moveably connected to the housing 114, and more particularly to the inner surface of the housing 114. The housing 114 may include a race track 114 to which the discharge deflector 208 is mounted. It should be appreciated that the threshing system 110 may not include a racetrack 114 onto which the discharge deflector 208 is mounted; and thereby, the discharge deflector 208 can be mounted to an extended rotor cage. The body of the discharge deflector 208 may be in the form of a monolithically formed, arced metal panel. In another exemplary embodiment, the discharge deflector 208 can be designed as two or more separate sections. If the discharge deflector 208 is formed as multiple sections, then the discharge opening 210 may be increased or decreased. In this regard, the size of the discharge opening may be increased in order to decrease the requisite horsepower of the rotor 112. Additionally, if the discharge deflector 208 is formed as multiple sections, the separate sections may be moved independently of one another via respective drives.

Figure 4:
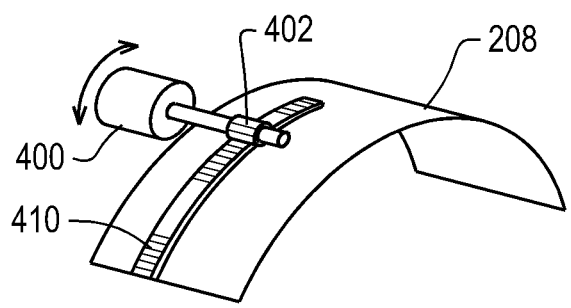
FIG. 4 illustrates a perspective view of the rotational deflector and a motor, in accordance with an exemplary embodiment of the present invention.
Figure 5:
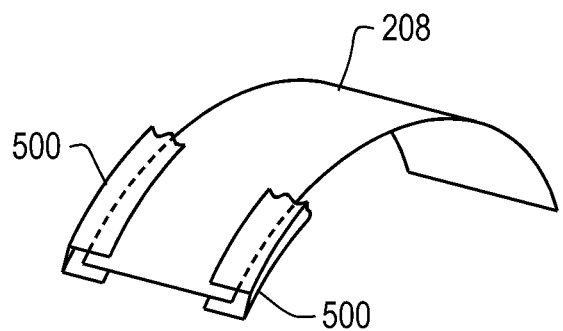
FIG. 5 illustrates a perspective view of the rotational deflector of FIG. 2, in accordance with an exemplary embodiment of the present invention.

Referring now to FIG. 4, the residue system 200 may also include a drive 400 for rotating the discharge deflector 208 relative to the rotor 112 in a circumferential direction. In more detail, the drive 400 may include a gear 402 and the discharge deflector 208 may have a corresponding gear track 410. In this respect, as the drive 400 rotates, the teeth of the gear 402 respectively mate with the gearing of the gear track 410 to rotate the whole body of the discharge deflector 208 around the rotor 112 in the circumferential direction. The drive 400 may be in the form of a hydraulic drive or an electric drive. It should be appreciated that the discharge deflector 208 may be moved by way of a hydraulic motor, an electrical motor, or manual actuation by an operator.

The drive 400 may also be operably coupled to a control unit. In this way, the movement of the discharge deflector 208 can be automated by the control unit to automatically adjust the discharge deflector 208 in various positions in order to automatically achieve an optimal spread distribution of the crop material discharged from the rotor 112. The control unit may be in the form of any desired electronic control unit (ECU), and the control unit may be incorporated into existing hardware and/or software of the agricultural vehicle 100. The control unit may include software code or instructions which are tangibly stored on a tangible computer readable medium. The computer readable medium may be in the form of a magnetic medium, e.g., a computer hard drive, an optical medium, e.g., an optical disc, solid-state memory, e.g., flash memory, or other storage media known in the art. Thus, any of the functionality performed by the controller described herein may be implemented in software code or instructions which are tangibly stored on the tangible computer readable medium. Upon loading and executing such software code or instructions by the control unit, the control unit may perform any of the functionality described herein.

Referring now collectively to FIGS. 2-5, the residue system 200 may also include a deflector track 500 circumferentially disposed around at least a portion of the rotor 112 and fixedly connected to the inner surface of the housing 114. The deflector track 500 is configured for slideably mounting the discharge deflector 208 such that at least a portion of the discharge deflector 208 is slideably received within the deflector track 500. For example, the deflector track 500 may extend fully around the travel path of the discharge deflector 208.

A method for operating an agricultural vehicle 100 is also provided by an exemplary embodiment of the present invention. The method includes an initial step of providing a residue system 200, as discussed above. The method also includes the steps of directing a crop material flow by the discharge deflector 208 toward the discharge chopper 202, changing a circumferential position of the discharge opening 210 by moving the discharge deflector 208, and maintaining the radial distance between the discharge deflector 208 and the rotor 112 as the circumferential position of the discharge opening 210 is changed.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
   a rotor configured for threshing a crop material;
   a housing located at a distance radially away from the rotor and circumferentially encasing at least a portion of the rotor, said housing having an inner surface facing the rotor;
   a discharge chopper positioned downstream of the rotor in a direction of crop material flow;
   a discharge deflector moveably connected to the housing, circumferentially disposed around at least a portion of the rotor, and located at a radial distance away from the rotor, said discharge deflector having a distal end that defines a discharge opening for allowing the crop material to pass from the rotor to the discharge chopper such that as said discharge deflector is moved a circumferential position of the discharge opening is correspondingly moved without changing said radial distance between the discharge deflector and the rotor; and
   a deflector track fixedly connected to the inner surface of the housing facing the rotor, said deflector track slideably mounting the discharge deflector such that at least a portion of the discharge deflector is slideably received within the deflector track.

2. The agricultural vehicle of claim 1, wherein the deflector track is circumferentially disposed around at least a portion of the rotor.

3. The agricultural vehicle of claim 1, further including a drive configured for rotating the discharge deflector relative to the rotor in a circumferential direction.

4. The agricultural vehicle of claim 3, wherein said drive is one of a hydraulic drive and an electric drive.

5. The agricultural vehicle of claim 3, wherein said drive includes at least one gear, and said discharge deflector includes a gear track such that said at least one gear correspondingly mates with said gear track in order to move the discharge deflector.

6. The agricultural vehicle of claim 1, wherein said discharge deflector extends around a majority of an upper perimeter of the rotor.

7. The agricultural vehicle of claim 1, wherein the discharge deflector is a monolithic, arced metal panel extending around a majority of an upper perimeter of the rotor.

8. The agricultural vehicle of claim 1, wherein the discharge deflector comprises multiple sections, each of said multiple sections being configured to be moved independently via a separate drive.

9. The agricultural vehicle of claim 1, wherein the deflector track extends fully around a travel path of the discharge deflector.

10. A residue system for an agricultural vehicle having a rotor and a housing surrounding the rotor, comprising:
- a discharge chopper configured for processing a crop material downstream of the rotor in a direction of crop material flow;
- a discharge deflector configured for being moveably connected to an inner surface of the housing that faces the rotor, circumferentially disposed around at least a portion of the rotor, and located at a radial distance away from the rotor, said discharge deflector having a distal end that defines a discharge opening for allowing the crop material to pass from the rotor to the discharge chopper such that as said discharge deflector is moved a circumferential position of the discharge opening is correspondingly moved without changing said radial distance between the discharge deflector and the rotor; and
- a deflector track fixedly connected to the inner surface of the housing facing the rotor, said deflector track slideably mounting the discharge deflector such that at least a portion of the discharge deflector is slideably received within the deflector track.

11. The residue system of claim 10, wherein the deflector track is circumferentially disposed around at least a portion of the rotor.

12. The residue system of claim 10, further including a drive configured for rotating the discharge deflector relative to the rotor in a circumferential direction.

13. The residue system of claim 12, wherein said drive is one of a hydraulic drive and an electric drive.

14. The residue system of claim 12, wherein said drive includes at least one gear, and said discharge deflector includes a gear track such that said at least one gear correspondingly mates with said gear track in order to move the discharge deflector.

15. The residue system of claim 10, wherein said discharge deflector is configured for extending around a majority of an upper perimeter of the rotor.

16. A method of operating an agricultural vehicle having a rotor and a housing surrounding the rotor, comprising the steps of:
- providing a residue system including a discharge chopper configured for processing a crop material downstream of the rotor in a direction of crop material flows;
- fixedly connecting a deflector track to an inner surface of the housing that faces the rotor;
- slideably mounting a discharge deflector to the deflector track such that at least a portion of the discharge deflector is slideably received within the deflector track, circumferentially disposed around at least a portion of the rotor, and located at a radial distance away from the rotor, said discharge deflector having a distal end that defines a discharge opening for allowing the crop material to pass from the rotor to the discharge chopper;
- directing a crop material flow by the discharge deflector toward the discharge chopper;
- changing a circumferential position of the discharge opening by moving said discharge deflector; and
- maintaining said radial distance between the discharge deflector and the rotor as said circumferential position of the discharge opening is changed.

17. The method of claim 16, wherein the deflector track is circumferentially disposed around at least a portion of the rotor.

18. The method of claim 16, further including a drive configured for rotating the discharge deflector relative to the rotor in a circumferential direction.

19. The method of claim 18, wherein said drive includes at least one gear, and said discharge deflector includes a gear track such that said at least one gear correspondingly mates with said gear track in order to move the discharge deflector.

20. The method of claim 16, wherein said discharge deflector is configured for extending around a majority of an upper perimeter of the rotor.

\* \* \* \* \*